C. M. MANOR.
INSECT TRAP.
APPLICATION FILED APR. 22, 1914.
1,125,701. Patented Jan. 19, 1915.
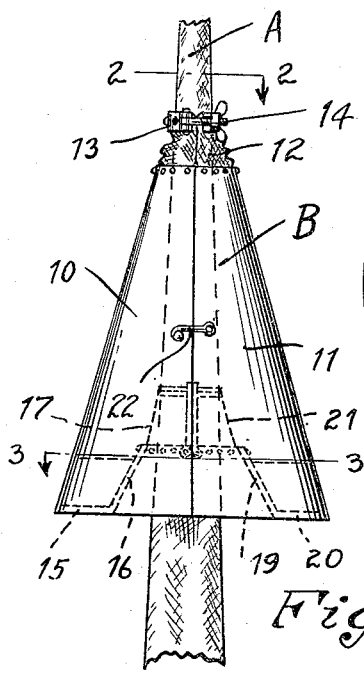
Fig.1.
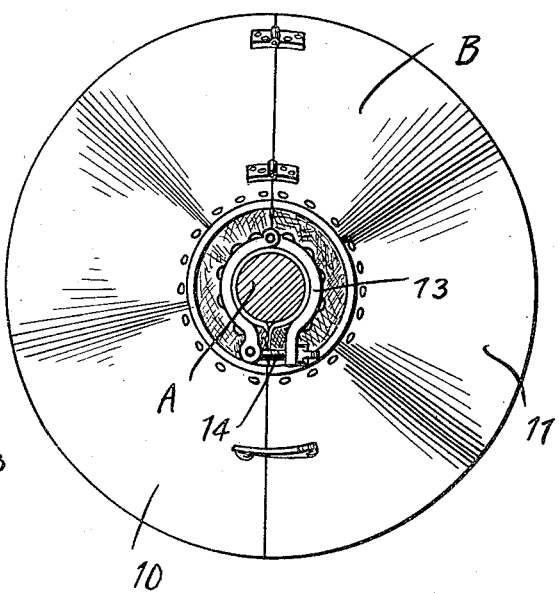
Fig.2.
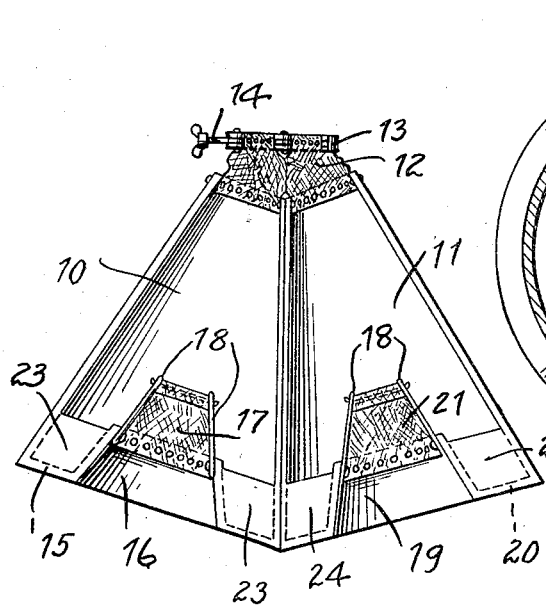
Fig.4
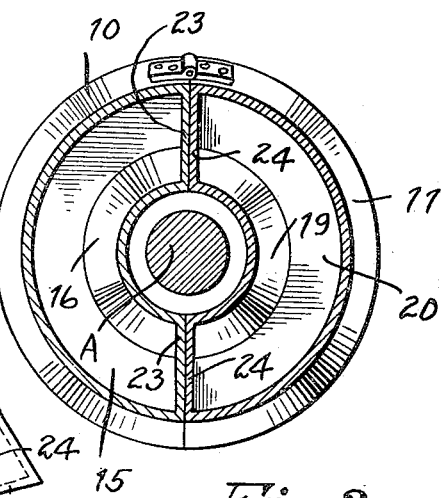
Fig.3.
Witnesses
M. S. Watson
Henry T. Bright
Inventor
C. M. Manor
By 
Attorneys

UNITED STATES PATENT OFFICE.

CARL MOORE MANOR, OF ALBANY, INDIANA.

INSECT-TRAP.

1,125,701.  Specification of Letters Patent.  Patented Jan. 19, 1915.

Application filed April 22, 1914. Serial No. 833,695.

*To all whom it may concern:*

Be it known that I, CARL MOORE MANOR, a citizen of the United States, residing at Albany, in the county of Delaware, State of Indiana, have invented certain new and useful Improvements in Insect-Traps; and I do hereby declare the following to be a full, clear, and exact description of the invention, such as will enable others skilled in the art to which is appertains to make and use the same.

This invention relates to insect traps.

The object of the invention resides in the provision of an insect trap particularly adapted to prevent insects from crawling up the trunk of a tree and damaging foliage or fruit.

A further object of the invention resides in the provision of a trap of the character named which can be readily attached to tree trunks of different diameters and which can be removed without permitting any of the insects confined therein to escape.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a view in elevation showing the improved trap associated with the trunk of a tree; Fig. 2, a section on the line 2—2 of Fig. 1; Fig. 3, a section on the line 3—3 of Fig. 1, and Fig. 4, a view looking at the interior of the trap with the sections thereof swung open.

Referring to the drawings A indicates the trunk of the tree and B the improved trap. The trap B is frusto conical and comprises hingedly connected sections 10 and 11. The smaller ends of the sections 10 and 11 have secured thereto the lower end of a fabric extension 12, the upper end of said extension 12 being secured to the inside of a clamping band 13 which is secured in clamping relation to the trunk B through the medium of a binding screw 14. Owing to the fact that the fabric extension 12 is secured to the inside of the band 13 it will be obvious that when the band is clamped upon the trunk the fabric extension at its outer end will be forced into and fill the crevices of the bark and prevent movement of insects by the band 13. Secured to the section 10 through the medium of a web 15 and extending in the same general direction as the section 10 is a semi frusto-conical member 16 the free end of which has secured thereto a fabric extension 17 supported by side wires 18. A similar semi frusto-conical member 19 is secured to the section 11 by a web 20 and this section is provided at its free end with a fabric extension 21 similar to the fabric extension 17. The sections 10 and 11 are secured in closed position by means of a latch 22. The section 10 and member 16 are connected by partitions 23, while the section 11 and member 19 are connected by partitions 24, said partitions 23 and 24 serving to prevent the escape of insects confined between the sections and members when the former are moved to open position for the purpose of disengaging the trap from the tree trunk. It will be noted that when the trap is applied to the tree trunk insects can pass upwardly beneath the upper extremities of the fabric section 17 and 21 but cannot pass downwardly beneath said extremities owing to the inclination of the fabric extensions with respect to the tree trunk. After the insects have passed beneath the outer ends of the fabric extensions 17 and 21 they cannot pass beneath the band 13 and will therefore finally migrate between the members 17 and 19 and the sections 10 and 11 where they will remain until the trap is removed and the destruction of the insects effected.

What is claimed is:—

An insect trap comprising a pair of hingedly connected semi-conical sections adapted to be secured together in embracing relation to a tree trunk, a fabric extension secured to the minor ends of said sections, a clamping band secured to said extension and adapted to be clamped around a tree trunk to support the trap, inwardly directed flanges at the major ends of said sections, semi-conical members secured to the free edges of said flanges respectively and extending in the same general direction as said section, and fabric extension on said semi-conical members adapted to bear at their outer extremities upon a tree trunk.

In testimony whereof, I affix my signature, in the presence of two witnesses.

CARL MOORE MANOR.

Witnesses:
G. G. WILLIAMSON,
WILLIAM E. O'NEIL.

Copies of this patent may be obtained for five cents each, by addressing the "Commissioner of Patents, Washington, D. C."